July 7, 1964     M. E. REINECKE ET AL     3,139,755
PNEUMATICALLY-ACTUATED DIAPHRAGM VALVE
Original Filed Sept. 1, 1960     7 Sheets-Sheet 1

INVENTORS
M.E. REINECKE
EMMERICH GUENTHER
BY
Hudson & Young
ATTORNEYS

INVENTORS
M. E. REINECKE
EMMERICH GUENTHER
BY Hudson L. Young
ATTORNEYS

INVENTORS
M.E. REINECKE
EMMERICH GUENTHER
BY Hudson & Young
ATTORNEYS

FIG. 14

July 7, 1964   M. E. REINECKE ET AL   3,139,755
PNEUMATICALLY-ACTUATED DIAPHRAGM VALVE
Original Filed Sept. 1, 1960   7 Sheets-Sheet 7

INVENTORS
M.E. REINECKE
EMMERICH GUENTHER
BY Hudson & Young
ATTORNEYS

United States Patent Office 3,139,755
Patented July 7, 1964

3,139,755
PNEUMATICALLY-ACTUATED DIAPHRAGM VALVE
Marvin E. Reinecke and Emmerich Guenther, Bartlesville, Okla., assignors to Phillips Petroleum Company, a corporation of Delaware
Original application Sept. 1, 1960, Ser. No. 53,530. Divided and this application Dec. 19, 1960, Ser. No. 76,921
8 Claims. (Cl. 73—422)

This invention relates to a valve mechanism. In one aspect it relates to a multi-port, diaphragm-sealed valve. In another aspect it relates to a fluid-actuated, single diaphragm-operated, sampling valve for suppling slugs of sample gas to the sorption columns of a chromatographic analyzer.

This application is a continuation-in-part of our copending application Serial No. 33,042, filed May 31, 1960 now abandoned, and a divisional of the copending application Serial No. 53,530, filed September 1, 1960.

Gas chromatography is a known method of analyzing fluid samples by preferential sorption and desorption. The desirability of using chromatography for such specific uses as fractionation (multi-stage distillation) control has been recognized for some time. Certain features of process chromatography, such as specific measurement, high sensitivity and simplicity of operation make this type of analyzer very attractive for use in automatic process control. There are, however, some apparently inherent features of chromatography which have appeared to be obstacles in adapting chromatography to wide-spread use in process control. The first of these features is the fact that the chromatographic analysis time is long. Ordinarily, analysis time cycles range from 10 to 30 minutes, which may be acceptable for some purposes, but are often inadequate for close control of a process operation.

Another problem in high-speed chromatography is the manner of periodically directing a sample slug to a chromatographic analyzer, with as little control mechanism as is possible. This is desired in order to increase the reliability of operation and achieve minimal volume between the process stream being sampled and the sensing device, thereby reducing the analysis time cycle to that required for close control of a process operation. Presently used sampling valves are actuated by motor shafts that require careful sealing and packing to avoid even the slight leaks from the valve chambers that would destroy the usefulness of such valves in high speed chromatography. Coincident with these older types of sample valve control are added space requirements, which are undesirable from the point of view of the analysis time cycle as previously noted.

Still another problem that occurs is when it is desirable, or even necessary, to take only a liquid sample from a process stream, rather than first vaporizing a sample stream thereof. Selecting a slug of vaporized sample therefrom for analysis is the practice in most of the prior art. A major reason for liquid sampling is to eliminate the possibility of sample fractionation or reaction, such as polymerization, which can be encountered when a sample stream of wide boiling range is vaporized prior to a sample slug being taken therefrom. As an example, butadiene would polymerize at higher temperatures if such a process stream were to be first vaporized before being sampled. In the practice of this invention, some other advantages accrue from liquid sampling at normal analyzer temperature of about 120° F., namely, the sorption columns are more efficient and last longer, and simpler chromatographic analyzer construction is possible.

Where there is a need for liquid sampling, most commercially available types of sampling valves, having external sample loops, become unsuitable because of the relatively large sample loop volume. These external sample loops generally cannot be reduced in volume to a degree sufficient to provide a sample slug of a size suitable for the newer sorption columns.

The first embodiment of the present invention employs a pneumatically-actuated, single diaphragm valve for sealing the passages between adjacent members of a plurality of ports in a sampling valve, as desired. This is accomplished by directing a power fluid to selected areas on one side of the diaphragm through passages in the valve body thereby sealing the opposing face of the diaphragm against the adjacent surface of another part of the valve body and closing the passages between adjacent ports therein, as desired. Areas of the diaphragm adjacent to the ports, and when not under power gas pressure, can recede into dish-shape depressions in the surface of the valve comprising the power gas inlets. This permits flow of carrier or sample gas, as the case may be, under the diaphragm between the valve ports, whenever they exert a positive gas pressure. This invention also eliminates the necessity for motors, shafts, and packings, substituting therefor a compact sampling valve and control apparatus that achieves the desired small volume required for reduced analysis time. It permits a great many cycles of operation before requiring replacement of the sole working part, a flexible plastic diaphragm, capable of withstanding operation at high temperatures and under corrosive conditions, becomes necessary.

The second embodiment of the present invention employs a pneumatically-actuated, single diaphragm sample valve, provided with a small drilled passage between the two valve ports that formerly were the terminals of the external sample loop. This passage serves as a sample loop, and provides the small volume necessary in liquid phase sampling.

It is, therefore, an object of this invention to provide a sampling valve for use in a chromatographic analyzer system, whereby the analysis time cycle can be reduced to that required at high speed operation.

It is also an object to provide a fast response, small internal volume, fluid-actuated, diaphragm-sealed sampling valve for suppling sample slugs to the columns of a chromatographic analyzer.

It is another object to provide a valve which can withstand operation at high temperatures and under corrosive conditions.

It is a still further object to provide a valve which can undergo a great number of cycles of operation without leaking or failure or requiring the replacement of working parts.

It is also an object to provide a fast response, small internal volume sample loop, fluid-actuated, diaphragm-sealed sampling valve for selecting micro-liter size liquid sample slugs.

Further objects and advantages of this invention will become apparent to those skilled in the art from a study of the accompanying disclosure, appended claims, and drawing, in which:

Figure 1:
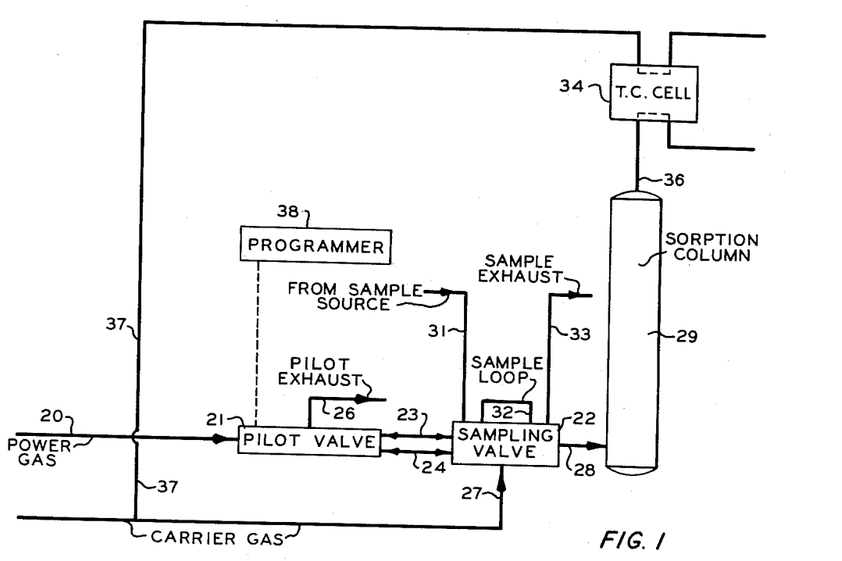
FIGURE 1 is a schematic flow diagram of a chromatographic analyzer system embodying the sampling valve of this invention.

Reference is now made to the drawing in detail, wherein like parts have been designated by like reference numerals, and to FIGURE 1 in particular, wherein a power gas, such as air, passes via conduit 20 to pilot valve 21, wherein the power gas stream is directed to a first side of a pneumatically-actuated, diaphragm-sealed sampling valve 22 via conduit 23. Meanwhile, the second side of sampling valve 22 is being vented via conduit 24, pilot valve 21, and pilot exhaust conduit 26. A carrier gas, such as helium or hydrogen, is passed via conduit 27, sampling valve 22, and conduit 28 to column 29. A gaseous sample from the process stream, introduced to sampling valve 22 via conduit 31, is being circulated through sample loop 32 of sampling valve 22 and vented therefrom via sample exhaust conduit 33. Periodically, the sample in loop 32 is passed along with the carrier gas, via conduit 28, to sorption column 29, where constituents of the sample to be identified and measured, are absorbed or adsorbed, depending upon the nature of the contact material, and then are selectively desorbed by a continuing flow of carrier gas therethrough.

The effluent from the sorption column 29 passes through an analyzer, indicated as thermal conductivity assembly 34, via conduit 36. The output signal from the detector 34 is passed to a recording instrument (not shown), which can be a conventional strip chart recorder. A stream of carrier gas is passed via conduit 37 from conduit 27 directly to the reference cell of detector 34, so as to balance out the effect of the carrier gas in the column 29 effluent. The sample gas to be analyzed generally enters the system continuously through conduit 31. It is exhausted through conduit 33, even when a slug thereof is selected for analysis. Pilot valve 21 is actuated by programmer 38, which can be operated by a time cycle or other means. For a detailed discussion of the design and manner of operation of a typical pilot valve to be used in conjunction with this invention, see the copending application of Emmerich Guenther, Serial No. 858,997, filed December 11, 1959.

When pilot valve 21 is changed from the first described position, power gas is now directed to the second side of sampling valve 22 via conduit 24. Carrier gas now passes to sample loop 32, collecting the sample trapped therein, and carrying the same to sorption column 29, via conduit 28. Meanwhile, the first side of sampling valve 22 is vented via conduit 23, pilot valve 21 and pilot valve exhaust conduit 26. Thus, each time pilot valve 21 is switched to the alternate position of operation, a measured sample is passed via conduit 28 to column 29 for sorption and desorption therein.

Figure 2:
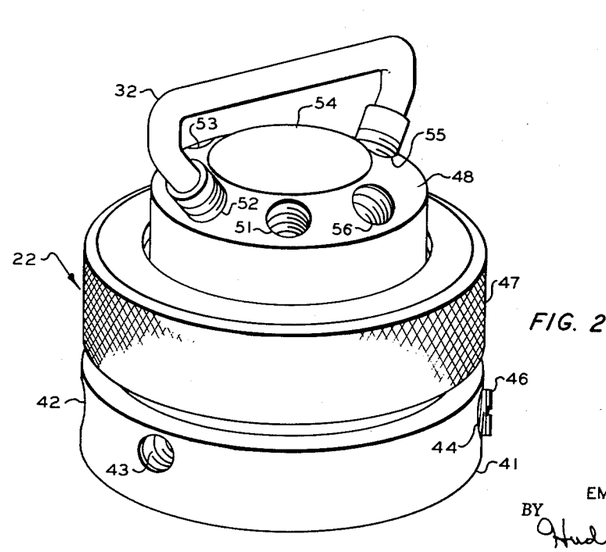
FIGURE 2 is a perspective view of an assembled, fluid-actuated diaphragm-sealed valve of this invention.

In FIGURE 2, there is shown a perspective view of the assembled fluid-actuated single diaphragm, sampling valve of this invention, generally designated 22. Sampling valve 22 comprises a lower first block 41 having a pair of threaded horizontal passages, 42 and 43, disposed therein. Block 41 is further provided with another threaded horizontal passage 44, having a threaded adjusting screw 46, with a notched head, disposed therein. A metal locking ring 47 is threadedly secured to lower body 41 and is spaced therefrom by the concealed shoulder of upper body 48 and an aluminum sealing ring (not shown).

Upper body 48 is provided with six threaded inclined passages, 51 to 56, which communicate with the lower surface of upper block 48 by diverging passages (not shown). Sample loop 32 communicates between passages 52 and 55.

Figure 3:
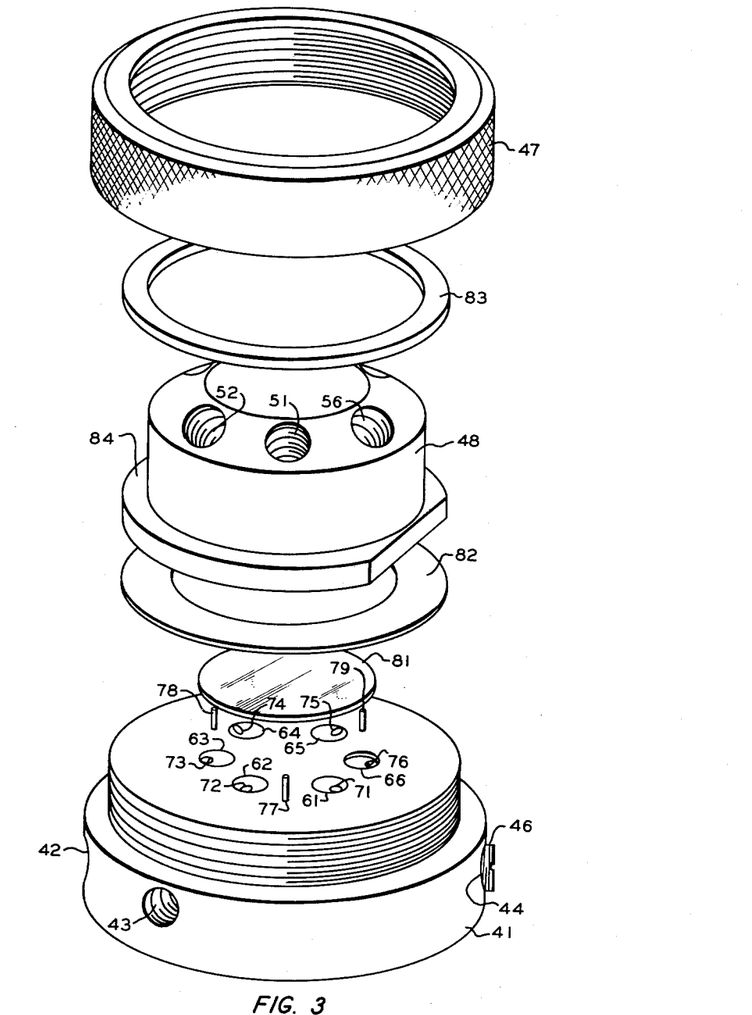
FIGURE 3 is an exploded perspective view of the components of the first embodiment of the diaphragm valve of this invention arranged in the order of their assembly.

Referring now to FIGURE 3, in lower block 41 is found six dish-shaped depressions or cavities, 61 to 66, each being provided with a port, 71 to 76, of the inclined passages within block 41 (not shown) communicating with horizontal passages 42 and 43. The upper surface of lower block 41 is further provided with three lugs, 77 to 79, disposed equi-spaced about the circle described by depressions 61 to 66.

A flexible, plastic diaphragm 81, of a diameter suited to seat within said lugs and completely cover said cavities is disposed above lower body 41. Diaphragm 81 is preferably composed of a thermosetting plastic which is chemically inert and heat resistant, such as Teflon (a polymer of tetrafluoroethylene).

A thin metal shim 82, the inner diameter of which is greater than that of the circle described by lugs 77 to 79, is disposed above block 41. It of a thickness adapted to prevent diaphragm 81 from being unduly compressed, and perhaps permanently deformed, upon the tightening of upper body 48 against lower body 41 by threaded locking ring 47. A metal ring 83, of generally rectangular cross-section and preferably composed of aluminum, seats on the shoulder 84 of upper body 48 beneath locking ring 47. Ring 83 is designed to maintain a gas-tight seal between bodies 48 and 41 with the plastic diaphragm interposed therein. This is accomplished by virtue of its ability to compress and allow seating of blocks 41 and 48, metal to metal, with shim 82, and thus correct for slight non-parallelism which is possible even with the close tolerances in the manufacturing process.

Figure 4:
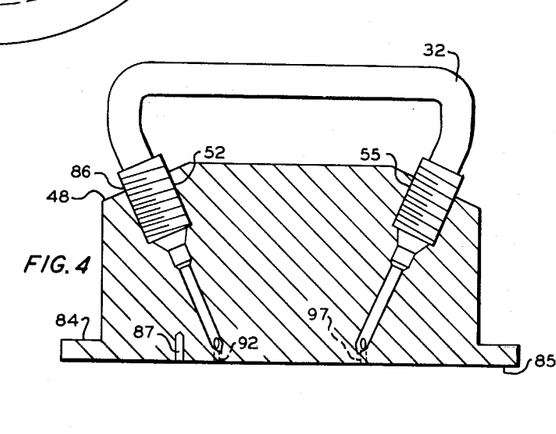
FIGURE 4 is a full section view of the upper member of the valve of the first embodiment of this invention, with filter fittings removed.

In FIGURE 4, upper block 48 is shown in full section. Inclined threaded passages 52 and 55 are in communication via sample loop 32 of said block, and juncture points just above the lower surface 85 of block 48. Passages 52 and 55 then fork into diverging channels which communicate with lower surface 85. Lower surface 85 is provided with a recess 87 adapted to receive therein lug 77 of lower block 41. Sample loop 32 is secured to passages 52 and 55 via filter fittings, such as 86, which are threadedly secured therein.

Figure 5:
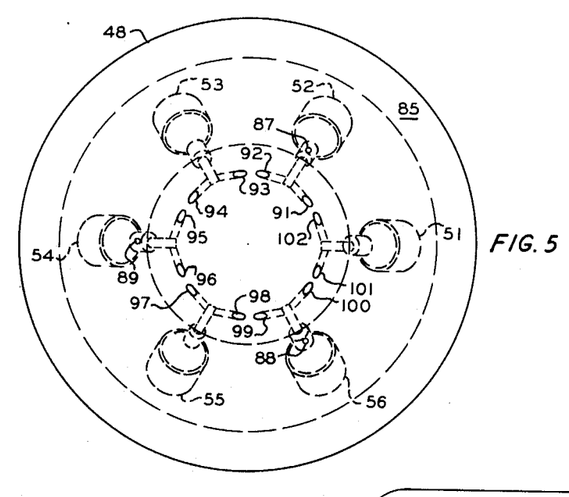
FIGURE 5 is a bottom plan view of the same upper valve member.

In FIGURE 5 is shown a bottom view of upper block 48, with lug recesses 87, 88 and 89 clearly seen therein. The terminals 91 to 102 of inclined passages 51 to 56 can be seen in lower face 85 of upper block 48.

Figure 6:
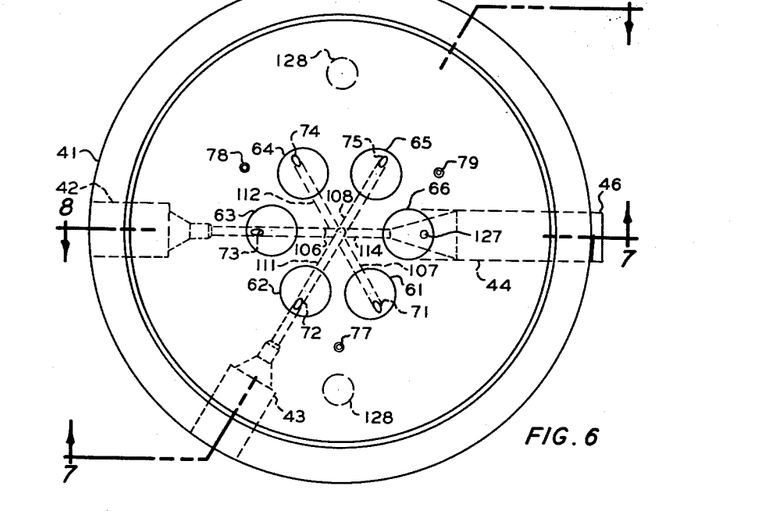
FIGURE 6 is a top plan view of the lower member of the valve of this invention.

In FIGURE 6, horizontal passages 42, 43 and 44 are shown in their relation to one another and to depressions 61 to 66. Horizontal passage 42 communicates directly with depression 63 which, in turn, communicates with depressions 61 and 65 via inclined passages 106, 107 and 108, respectively. Horizontal passage 43 communicates directly with depression 62 which, in turn, communicates with depressions 64 and 66 by inclined passages 111, 112, and 114, respectively. Cavity 66 can be changed in volume by means of adjusting threaded screw 46, which can be better seen in FIGURE 7.

Figure 7:
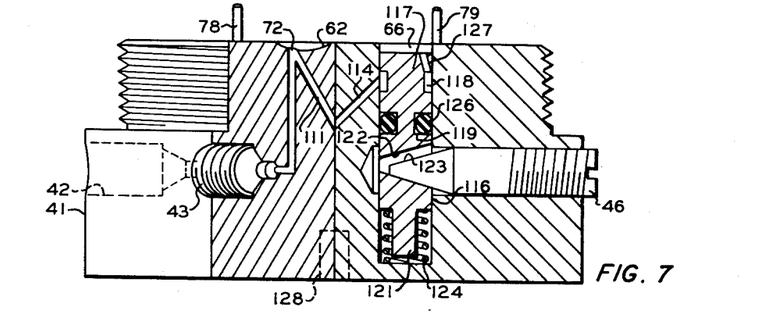
FIGURE 7 is a detailed front sectional view taken along lines 7—7 in FIGURE 6.

Block 41 is provided with a cylindrical chamber 116 of a diameter equivalent to that of said cavities. A plug 117 is slidably disposed in chamber 116 and is provided with three channeled portions 118, 119, and 121 about its periphery. Plug 117 is further provided with a tapered recess 122 adapted to receive therein the tapered end 123 of adjusting screw 46. The lower end of plug 117 is disposed within a compression spring 124 which biases plug 117 upwardly against adjusting screw 46. Middle channel 119 of plug 117 is provided with a plastic O-ring 126 in sealing contact with the walls of chamber 116. Inclined passage 114 is in communication with peripheral channel 118 of plug 117. Passage 127 of plug 117 communicates between channel 118 thereof and depression 66. Block 41 is further provided with a pair of threaded chambers, such as 128, in its lower surface adapted to receive threaded ports therein for fastening assembled valve 22 to a suitable mounting.

Figure 8:
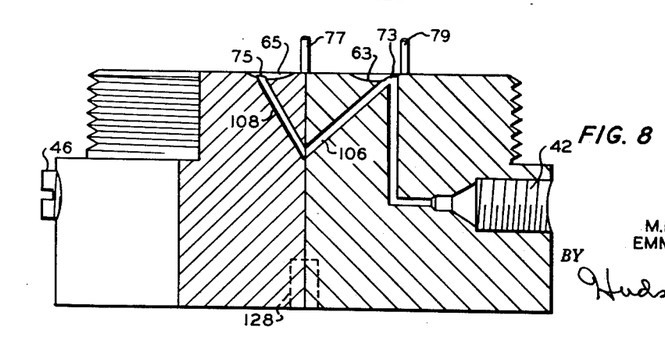
FIGURE 8 is a detailed rear sectional view taken along lines 8—8 in FIGURE 6.

In FIGURE 8 is shown how horizontal passage 42 communicates directly with depression 63, and therefrom via inclined passages 106 and 108 to depression 65, likewise via passages 106 and 107 (not shown) to depression 61.

Figure 9:
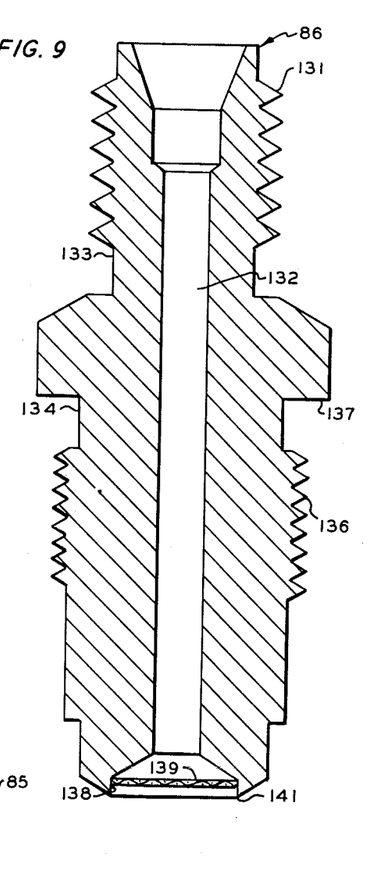
FIGURE 9 is an elevational view, in full section, of a filter fitting to be threadedly mounted in threaded passages of the valve of this invention.

In FIGURE 9 is shown a filter fitting, generally designated 86, adapted to be threadedly secured in any or all of threaded passages 51 to 56 of upper block 48, as desired. Fitting 86 is provided with a central passage 132 traversing the axis of said fitting. The external end of central passage 132 is counterbored and countersunk. The periphery 131 of the external end of fitting 130 is threaded to receive a threaded connecting nut thereon (not shown). The connecting nut is sealably connected to the appropriate conduits leading to and from other parts of the analyzer system. Fitting 86 is provided with two channels 133 and 134 in the periphery thereof and disposed intermediate the ends thereof. Threaded lower section 136 of fitting 86 is adapted to be threadedly received in one of the threaded inclined passages of upper block 48, with the shoulder 137 of section 136 abutting the inclined surface of block 48, when fitting 86 is completely threaded therein. The internal end of central passage 132 is countersunk and counterbored to receive therein a filter of wire screen 139. The sharp circular edge 141 of lower end 138 is crimped inwardly to retain filter 139 in place.

Figure 10:
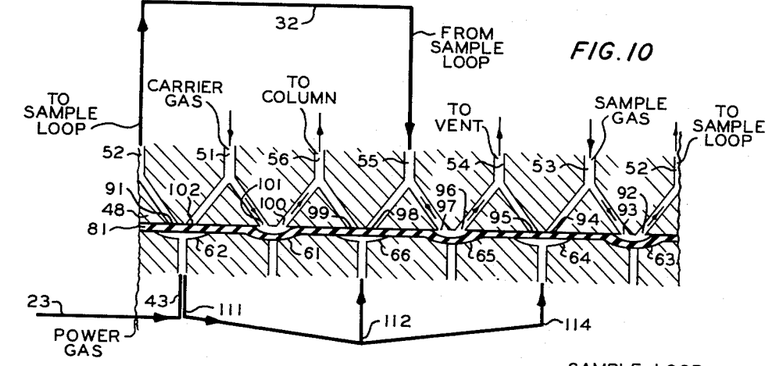
FIGURE 10 is a longitudinally-extended full section of the central portion of the assembled valve of FIGURE 2, shown in one position of operation.

In operation, when power gas flows to sampling valve 22 from pilot valve 21, via conduit 23, the flow path of carrier gas and sample gas is shown schematically in FIGURE 10, which is a longitudinally-extended full section of the central portion of sampling valve 22. Power gas from pilot valve 21 enters passage 43 of sampling valve 22 from conduit 23. Power gas flows via passage 43 to cavity 62 and therefrom by inclined passages 111, 112, and 114 to cavities 64 and 66. Thus, the portions of diaphragm 81 adjacent to said cavities, seal against the lower face 85 of upper block 48, closing off ports 91 and 102 from converging passages 51 and 52; ports 98 and 99 from passages 55 and 56; and ports 94 and 95 from passages 53 and 54. Carrier gas in conduit 27, under greater than atmospheric pressure, enters sampling valve 22 via inclined passage 51 in upper body 48 thereof. Passage 51 diverges into two passages before reaching lower surface 85 of block 48, but because the diverging passage to depression 62 is sealed by diaphragm 81, the carrier gas may flow under diaphragm 81 through cavity 61, to the passage 56, and out of valve 22 via conduit 28 to sorption column 29.

Concurrently, sample gas from sample source conduit 31 enters sampling valve 22 through inclined passage 53. Again, because the one passage to cavity 64 of lower body 41 is sealed by diaphragm 81, the sample gas passes only through the other fork through cavity 63, and out passage 52 to conduit 32, which is the sample loop of sampling valve 22. Sample loop 32 re-enters valve 22 via passage 55, passes through cavity 65 over to passage 54 and out of valve 22, via sample exhaust conduit 33 to vent.

Figures 11, 12:
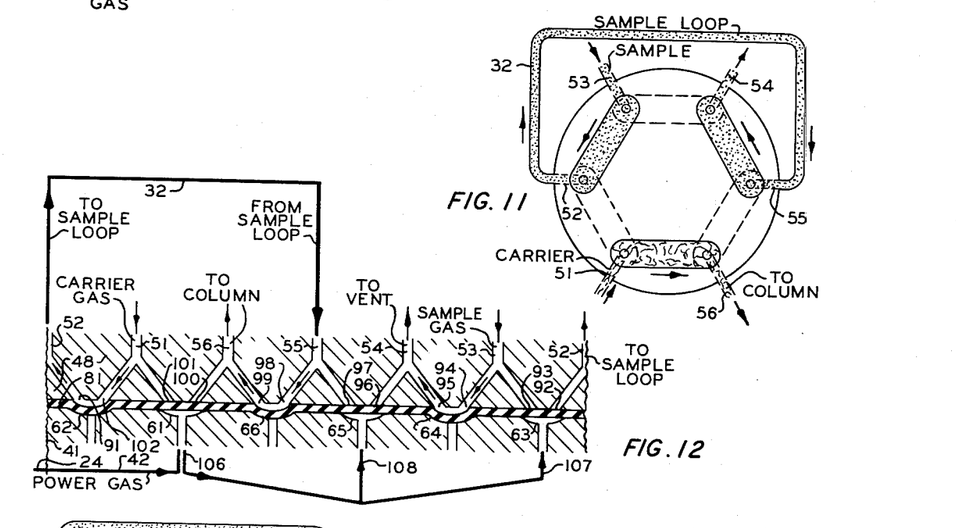
FIGURE 11 is a schematic view showing the path of flow of the system gases through the valve passages, corresponding to the diaphragm position shown in FIGURE 10.
FIGURE 12 is a longitudinally-extended full section of the central portion of the assembled sampling valve of FIGURE 2, indicating the alternate position of operation.

FIGURE 11 shows diagrammatically the paths of flow of carrier and sample gas through sample valve 22 corresponding to the first described position of operation.

Figure 13:
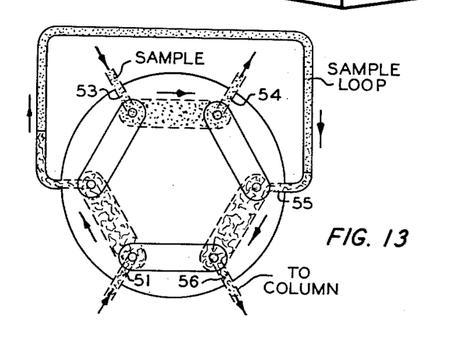
FIGURE 13 is a schematic view showing the path of flow of the system gases through the valve passages, corresponding to the diaphragm position shown in FIGURE 12.

When pilot valve 21 switches to its alternate position, as directed by programmer 38, power gas from pilot valve 21 now passes through conduit 24 to sampling valve 22. The alternate flow path of carrier gas and sample gas is shown schematically in FIGURE 12. It enters lower body 41 of sampling valve 22 via horizontal passage 42 and flows directly to cavity 63 thereof. Power gas then flows via inclined passages 106, 107, and 108 to depressions 61 and 65, respectively. Thus, the portions of diaphragm 81 adjacent to said cavities make sealing contact with the lower face 85 of upper block 48, closing off ports 92 and 93 from converging passages 52 and 53; ports 96 and 97 from converging passages 54 and 55; and ports 100 and 101 from converging passages 51 and 56. Carrier gas in conduit 27 enters sampling valve 22 via inclined passage 51. Because of the new position of diaphragm 81, carrier gas can pass only through the other fork of channel 51, through cavity 62, under diaphragm 81 to passage 52, and out of valve 22 to sample loop 32 thereof. Sample loop 32 re-enters valve 22 via passage 55, passing through one fork thereof, through cavity 66 under diaphragm 81 to passage 56, and out of valve 22 via conduit 28 to sorption column 29, driving a slug of gaseous sample trapped in sample loop 32 before it. Meanwhile, vaporized sample gas in conduit 31 continues to enter valve 22 via passage 53, passing through the cavity 64 under diaphragm 81, to passage 54, and out of valve 22 via exhaust conduit 33 to vent. FIGURE 13 shows diagrammatically the paths of flow of carrier and sample gas through sample valve 22 in the alternate position of operation.

When pilot valve 21 once more switches back to the original position, the paths of flow of carrier gas will revert to the cavities described in connection with FIGURE 10. Thus, the paths of flow of the carrier and sample gases will return to that shown in FIGURE 11, until it is desired to pass another sample slug to sorption column 29. The frequency with which the sample slug is passed to the sorption column is determined by the switching of pilot valve 21, controlled through programmer 38.

Figure 14:
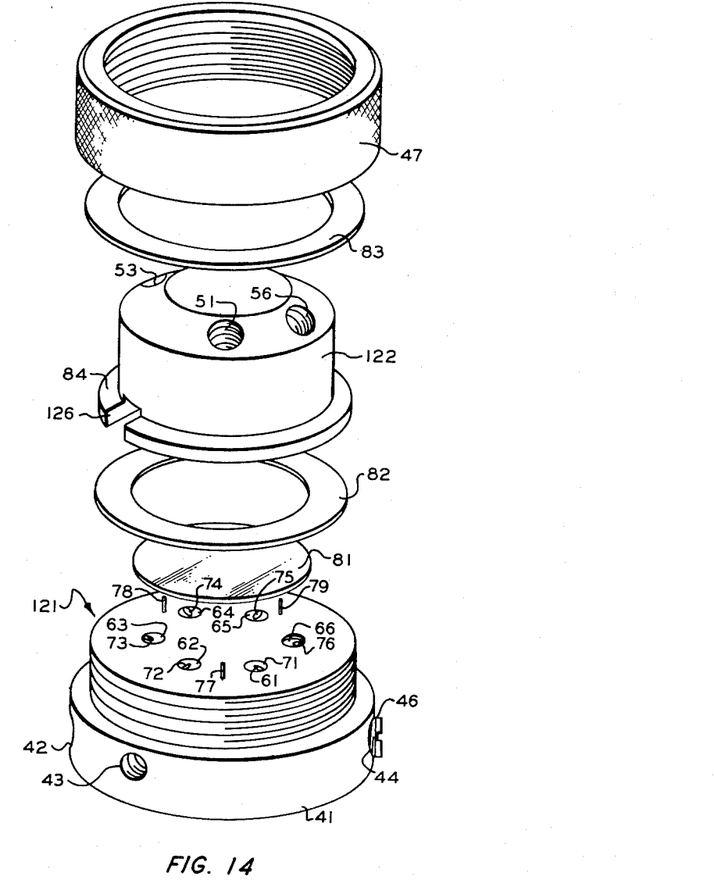
FIGURE 14 is an exploded perspective view of the components of the second embodiment of the diaphragm valve of this invention arranged in the order of their assembly.

Referring now to FIGURE 14, there is shown an exploded perspective of the components of the second embodiment of the sampling valve of this invention, generally designated 121. All of the components are of identical design and function, with the exception of upper body 122, which has been modified to provide sample slugs of microliter-sized volume to sorption column 29. Upper body 122 is provided with only four threaded inclined passages 51, 53, 54 and 56, all of which communicate with the lower surface of upper block 122 by diverging passages, such as seen in FIGURE 5.

Figure 15:
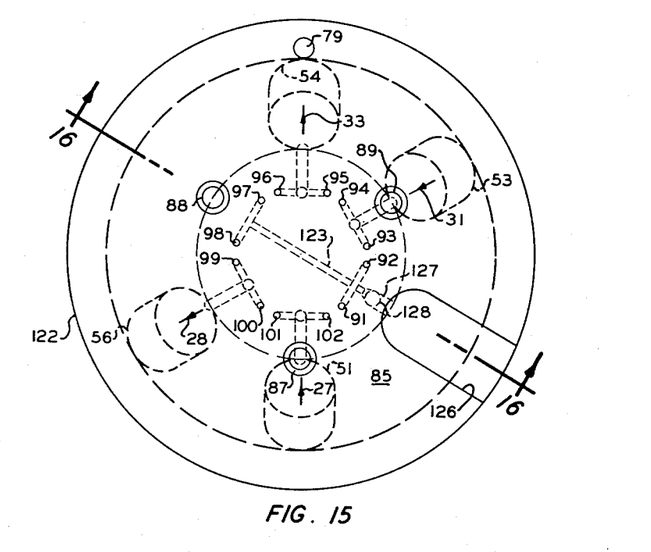
FIGURE 15 is a bottom plan view of the upper member of the valve of the second embodiment of this invention.

In FIGURE 15 is shown a bottom view of upper block 122 with lug recesses 87, 88 and 89 clearly shown therein. The terminals, or ports, 91–102 of inclined passages 51, 53, 54 and 56 and an internal sample loop 123 can be seen in lower face 85 of upper block 122. Horizontal passages 126 and 127 are also provided in upper block 122 extending from an area external of said block to a point intermediate the center thereof.

Figure 16:
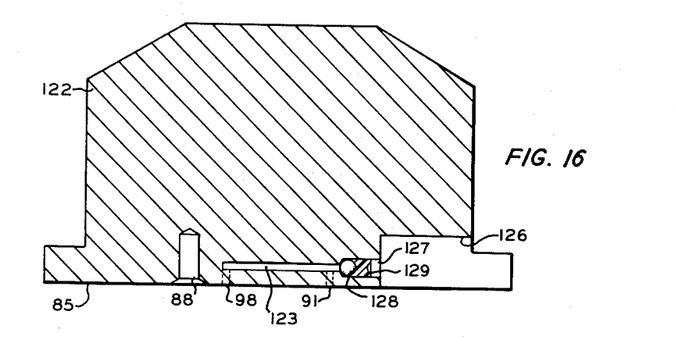
FIGURE 16 is a detailed back sectional view taken along lines 16—16 in FIGURE 15.

In FIGURE 15 is shown another full section of upper block 122, also depicting horizontal passages 126 and 127, a stainless steel ball 128, and centrally disposed small diameter passage 123, which serves as the internal sample loop of this invention.

As indicated previously, where a substantially smaller volume for the sample loop is necessary, than is possible by an external loop arrangement, a reduced sample loop volume can be achieved by eliminating the external loop path of flow, which loop volume determines the size of the sample slug to be passed to sorption column 29. A substitute passage for the omitted external loop consists of horizontal, small diameter passage 123, disposed between the confluence of the passages in communication with ports 97 and 92 at one end, thereof, and in communication with ports 97 and 98 for the other end of loop 123. This horizontal passage serves as a complete substitute for the external loop arrangement.

Larger diameter passage 126 extends from an area external of said block to a point intermediate the center thereof. Smaller diameter passage 127 is counterbored or drilled from the inner end of passage 126 to a point just short of a circle described by the ports of the six sets of diverging passages. Then sample loop passage 123 is counterdrilled from the inner end of intermediate diameter passage 127 to provide communication between diverging passages 91, 92, 97 and 98. Subsequently, a metal ball 128, of a diameter larger than passage 127, is passed into and pressure sealed at the inner end thereof. Any suitable resin 129, such as Glyptal, manufactured by the General Electric Company, may be used to insure a gas-tight seal and avoid leakage, by filling into passage 127. Thus, inner sample loop 123 is provided and is sealed off from the outside area.

In operation, the second embodiment of the sampling valve performs almost identically to that of the first embodiment. The sole but critical difference is that the sample flows through internal sample loop 123 in the second embodiment, instead of through external sample loop 32 of the first embodiment. Thus, when pilot valve 21 switches to its alternate position, a very small volume fluid sample slug passes from sampling valve 22 through conduit 28 to sorption column 29.

Regarding the schematic representation of the flow paths shown in FIGURES 10 to 13 for the first embodiment, these schematics will also depict the operation of the second embodiment except the sample loop will be internal of the sampling valve, and is numbered 123 to differentiate it from the external sample loop 32.

Although the valve of this invention is described as applied to a chromatographic analyzer system, it is not limited thereto but it can be employed in any situation where a single diaphragm valve and a microliter sized slug of a sample fluid is required. Reasonable variations and modifications are possible within the scope of this disclosure without departing from the spirit and scope of this invention.

That which is claimed is:

1. A fluid-motor actuated valve system for distributing a first fluid to a selected conduit comprising, in combination: a first body having two opposite faces; at least first, second, and third spaced passages in said first body; each of said spaced passages communicating between the first of said faces and a separate point intermediate the faces thereof; each of said spaced passages there forking into two diverging passages terminating in the second of said faces so that said first spaced passage communicates with said first and second diverging passages, said second spaced passage communicates with said third and fourth diverging passages, and said third spaced passage communicates with said fifth and sixth diverging passages; a second body having a third face spaced from the second face of said first body; means to secure said first and second bodies, relative to one another in a fixed relationship; a first flexible diaphragm disposed within the area defined by said third face; spacer means disposed between said first and second bodies and provided with an axial hollow in which is disposed said first diaphragm, the latter being protected from deforming compression thereby; at least a first and second cavities in said third face adjacent said diaphragm and positioned opposite the ports of said first, second, third and sixth of said diverging passages in said first body, respectively, so that said first cavity is adjacent to the ports of said second and third diverging passages and said second cavity is adjacent the ports of said sixth and first diverging passages; first and second passages in said second body communicating between said first and second cavities, respectively, and an area external of said second body; a first conduit means connected to supply said first fluid to be distributed under a first pressure to said first spaced passage; a second conduit means connected to receive said first fluid from said second spaced passage; a third conduit means connected to receive said first fluid from said third spaced passage; a fourth conduit means connected to supply, when desired, a second fluid under a second pressure greater than said first pressure through said first passage in said second body to said first cavity to force an adjacent first portion of said diaphragm to seal between said ports of said second and third diverging passages of said first body; said fourth conduit means adapted to vent said first cavity, when desired, whereupon said first fluid pressure will establish communication between said second and third passages in said first body above said diaphragm; a fifth conduit means connected to supply, when desired, a third fluid under a third pressure greater than said first pressure through said second passage in said second body to said second cavity to force an adjacent second portion of said diaphragm to seal between said first and sixth diverging passages of said first body; said fifth means adapted to vent said second cavity, when desired, whereupon said first fluid pressure will establish communication between said first and sixth diverging passages in said first body above said diaphragm.

2. A fluid-motor actuated valve system for collecting one of a first fluid and a second fluid from one of their respective conduits comprising, in combination: a first body having two opposite faces; at least first, second, and third spaced passages in said first body; each of said spaced passages communicating between the first of said faces and a separate point intermediate the other face thereof; said of said spaced passages there forking into two diverging passages terminating in the second of said faces, so that said first spaced passage communicates with said first and second diverging passages, said second spaced passage communicates with said third and fourth diverging passages, and said third spaced passage communicates with said fifth and sixth diverging passages; a second body having a third face spaced from said second face of said first body; means to secure said first and second bodies, relative to one another in a fixed relationship; a first flexible diaphragm disposed within the area defined by said third face; spacer means disposed between said first and second bodies and provided with an axial hollow in which is disposed said first diaphragm, the latter being protected from deforming compression thereby; at least a first and second cavities in said third face adjacent said diaphragm and positioned opposite the ports of said second and third and fourth and fifth of said diverging passages in said first body, respectively, so that said first cavity is adjacent the ports of said second and third diverging passages, and said second cavity is adjacent the ports of said fourth and fifth of said diverging passages; first and second passages in said second body communicating between said first and second cavities, respectively, and an area external of said second body; a first means connected to supply said first fluid to be collected under a first pressure to said first spaced passage; a second means connected to supply said second fluid to be collected under a second pressure to said third spaced passage; a third means connected to receive fluid from said second spaced passage; a fourth means connected to supply, when desired, a third fluid under a third pressure greater than said first pressure through said first passage in said second body to said first cavity, thereby forcing an adjacent first portion of said diaphragm to seal between said ports of said second and third diverging passages; said fourth means being adapted to vent said first cavity, when desired, whereupon said first fluid pressure will establish communication between said second and third diverging passages in said first body above said diaphragm; a fifth conduit means connected to supply, when desired, a fourth fluid under a fourth pressure greater than said second pressure through said second passage in said second body, to said second cavity, thereby forcing an adjacent second portion of said diaphragm to seal between said fourth and fifth diverging passages of said first body; said fifth means being adapted to vent said second cavity, when desired, whereupon said second fluid pressure will establish communication between said fourth and fifth passages in said first body above said diaphragm.

3. A fluid-motor actuated valve system for distributing a first fluid comprising, in combination, a first body having two opposite faces; a first, second, third, fourth, fifth, and sixth spaced passages in said first body; each of said spaced passages communicating between the first of said faces and a separate point intermediate the other face thereof; each of said spaced passages there forking into two diverging passages terminating in the second of said faces so that said first spaced passage communicates with said first and second diverging passages, said second spaced passage communicates with said third and fourth diverging passages, said third spaced passage communicates with said fifth and sixth diverging passages, said fourth spaced passage communicates with said seventh and eighth diverging passages, and fifth spaced passage communicates with said ninth and tenth diverging passages, and said sixth spaced passage communicates with said eleventh and twelfth diverging passages; a second body having a third face spaced from said second face of said first body; means to secure said first and second bodies, relative to one another in a fixed relationship; a first flexible diaphragm disposed within the area defined by said third face; spacer means disposed between said first and second bodies and provided with an axial hollow in which is disposed said first diaphragm, the latter being protected from deforming compression thereby; a first, second, third, fourth, fifth, and sixth cavities in said third face adjacent said diaphragm and positioned opposite the ports of said first to twelfth diverging passages in said first body, respectively, so that said first cavity is opposite said first and twelfth diverging passages, said second cavity is opposite said second and third diverging passages, said third cavity is opposite said fourth and fifth diverging passages, said fourth cavity is opposite said sixth and seventh diverging passages, said fifth cavity is opposite said eighth and ninth diverging passages, and said sixth cavity is opposite said tenth and eleventh diverging passages; first to sixth passages in said second body communicating between said first to sixth cavities therein, respectively, and an area external of said second body; first means connected to supply said first fluid to be distributed under a first pressure to said second spaced passage; a second means connected to receive said first fluid from said first spaced passage; a third means connected to supply, when desired, a second fluid under a second pressure greater than said first pressure through said first, third and fifth passages to said first, third, and fifth of said cavities, thereby forcing adjacent first, third, and fifth portions of said diaphragm thereunder to seal between said ports of said first and twelfth, fourth and fifth, and eighth and ninth diverging passages of said first body; said third means being adapted to vent said first, third and fifth cavities, when desired, whereupon said first fluid pressure will establish communication between said ports of said first and twelfth, fourth and fifth and eighth and ninth diverging passages; a fourth conduit means connected to supply, when desired, a third fluid under a third pressure greater than said first pressure through said second, fourth and sixth passages to said second, fourth, and sixth of said cavities thereby forcing adjacent second, fourth and sixth portions of said diaphragm thereunder to seal between said second and third, sixth and seventh, and tenth and eleventh of said diverging passages; said fourth conduit means being adapted to vent said second, fourth and sixth cavities, when desired, whereupon said first fluid pressure will establish communication between said ports of said second and third, sixth and seventh, and tenth and eleventh passages in said first body above said diaphragm.

4. A fluid-motor actuated valve system for collecting one of a first fluid and a second fluid from one of their respective conduits comprising, in combination, a first body having two opposite faces, a first, second, third, fourth, fifth and sixth spaced passages in said first body, each of said spaced passages communicating between the first of said faces and a separate point intermediate the other face thereof, each of said spaced passages there forking into two diverging passages terminating in the second of said faces so that said first spaced passage communicates with said first and second diverging passages, said second spaced passage communicates with said third and fourth diverging passages, said third spaced passage communicates with said fifth and sixth diverging passages, said fourth spaced passage communicates with said seventh and eighth diverging passages, said fifth spaced passage communicates with said ninth and tenth diverging passages, and said sixth spaced passage communicates with said eleventh and twelfth diverging passages; a second body having a third face spaced from said second face of said first body, means to secure said first and second bodies, relative to one another in a fixed relationship; a first flexible diaphragm disposed within the area defined by said third face; spacer means disposed between said first and second bodies and provided with an axial hollow in which is disposed said first diaphragm, the latter being protected from deforming compression thereby; a first, second, third, fourth, fifth, and sixth cavities in a fourth face of said second body adjacent said diaphragm and opposite the ports of said first through twelfth of said diverging passages in said first body, respectively, so that said first cavity is opposite said first and twelfth diverging passages, said second cavity is opposite said second and third diverging passages, said third cavity is opposite said fourth and fifth diverging passages, said fourth cavity is opposite said sixth and seventh diverging passages, said fifth cavity is opposite said eighth and ninth diverging passages, and said sixth cavity is opposite said tenth and eleventh diverging passages; first to sixth passages in said second body communicating between said first to sixth cavities therein, respectively, and an area external of said second body; first means connected to supply said first fluid to be collected under a first pressure to said first spaced passage; a second means connected to supply said second fluid to be collected under a second presssure to said third spaced passage, a third means connected to receive said first and second fluids, as desired, from said sixth spaced passage; a fourth means connected to receive said second fluid from said fourth spaced passage; a fifth means communicating between said second and fifth spaced passages, a sixth means connected to supply, when desired, a third fluid under a third pressure greater than said first and second pressures through said first, third and fifth passages to said first, third and fifth of said cavities, thereby forcing adjacent first, third, and fifth portions of said diaphragm to seal between said ports of said first and twelfth, fourth and fifth, and eighth and ninth diverging passages of said first body; said sixth means being adapted to vent said first, third and fifth cavities, when desired, whereupon said first and second fluid pressures will establish communication between said ports of said first and twelfth, fourth and fifth, and eighth and ninth diverging passages, whereby said second fluid enters said valve system through said second means and passes through said fifth means and out of said valve system through said fourth means, while said first fluid enters said valve system through said first means and exits directly through said third means; a seventh means connected to supply, when desired, a fourth fluid under a fourth pressure greater than said first and second pressures through said second, fourth and sixth passages to said second, fourth and sixth of said cavities, thereby forcing a second, fourth, and sixth portions of said diaphragm thereunder to seal between said second and third, sixth and seventh, and tenth and eleventh of said diverging passages, whereby said first fluid now passes through said fifth means of said valve system and drives a trapped slug of said second fluid to said third means, while said second fluid enters said valve system through said second means and exits directly through said fourth means; and said seventh means being adapted to vent said second, fourth and sixth cavities, when desired, whereupon said first and second fluid pressures will establish communication between said ports of said second and third, sixth and seventh and tenth and eleventh passages in said first body above said diaphragm.

5. A two-position, fluid-actuated diaphragm valve sampling system comprising, in combination; a first body provided with a first set of spaced passages, each of said passages communicating between a region external of said first body and a separate point intermediate the lower surface thereof, each of said passages there forking into two diverging passages communicating between said juncture points and said lower surface, so that said first spaced passage communicates with said first and second diverging passages, said second spaced passage communicates with said third and fourth diverging passages, said third paced passage communicates with said fifth and sixth diverging passages, said fourth spaced passage communicates with said seventh and eighth diverging passages, said fifth spaced passage communicates with said ninth and tenth diverging passages, and said sixth spaced passage communicates with said eleventh and twelfth diverging passages; said lower surface further provided with a plurality of recesses adapted to receive therein a plurality of lugs affixed to an adjacent second body; said second body spaced from said first body by a thin metal shim having an inner diameter which is greater than that of a circle described by said lugs; a thin flexible diaphragm of a diameter suited to fit within said lugs; the portion of said upper surface of said second body adjacent said diaphragm being provided with a plurality of cavities so that said first cavity is opposite said first and twelfth diverging passages, said second cavity is opposite said second and third diverging passages, said third cavity is opposite said fourth and fifth diverging passages, said fourth cavity is opposite said sixth and seventh diverging passages, said fifth cavity is opposite said eighth and ninth diverging passages, and said sixth cavity is opposite said tenth and eleventh diverging passages; a power gas source; a first and second conduit means for conducting power gas therefrom to the external sides of said cavities in said second body and sealing the adjacent portions of said diaphragm against the said lower surface of said first body thereby closing the passages between certain of the adjacent external ports of said diverging channels in said first body, as desired; a carrier gas supply; a third conduit means for conducting carrier gas to one of said first set of passages; a sample source; a fourth conduit means for conducting vaporized sample to a second of said first set of spaced passages; a sample loop communicating between a third and fourth of said first set; a fifth conduit means for venting said vaporized sample gas from a fifth of said first set; and a sixth conduit means for conducting said carrier gas and said vaporized sample from the sixth of said first set of passages to a sorption column.

6. A two-position, fluid-actuated diaphragm valve sampling system comprising, in combination, a first body provided with a first set of spaced passages, each of said spaced passages being provided with a filter fitting threadedly secured therein, comprising a central passage traversing the axis of said fitting, the external end of said fitting being threaded and adapted to receive therein a connecting nut, the periphery of said fitting being provided with a first and second channels disposed intermediate the ends thereof, the lower of said channels being adapted to abut the upper surface of said first body, when completely threaded in one of said passages, the internal end of said central passage being counterbored and countersunk and adapted to receive therein a filter sheet, said filter sheet being secured in place by the inwardly crimped internal end of said fitting, each of said passages communicating between a region external of said first body and a separate point intermediate the lower surface thereof, each of said passages there forking into two diverging passages communicating between said juncture points and said lower surface, so that said first spaced passage communicates with said first and second diverging passages, said second spaced passage communicates with said third and fourth diverging passages, said third spaced passage communicates with said fifth and sixth diverging passages, said fourth spaced passage communicates with said seventh and eighth diverging passages, said fifth spaced passage communicates with said ninth and tenth diverging passages, and said sixth spaced passage communicates with said eleventh and twelfth diverging passages; said lower surface further provided with a plurality of recesses adapted to receive therein a plurality of lugs affixed to the upper surface of an adjacent second body; said second body spaced from said first body by a thin metal washer having an inner diameter which is greater than that of a circle described by said lugs; a thin flexible diaphragm of a diameter suited to fit within said lugs, the portion of said upper surface of said second body adjacent said diaphragm being provided with a plurality of cavities, so that said first cavity is opposite said first and twelfth diverging passages, said second cavity is opposite said second and third diverging passages, said third cavity is opposite said fourth and fifth diverging passages, said fourth cavity is opposite said sixth and seventh diverging passages, said fifth cavity is opposite said eighth and ninth diverging passages, and said sixth cavity is opposite said tenth and eleventh diverging passages; a power gas source; a first and second conduit means for conducting power gas therefrom to the external sides of said cavities in said second body and sealing the adjacent portions of said diaphragm against the said lower surface of said first body thereby closing the passages between certain of the adjacent external ports of said diverging channels in said first body as desired; a carrier gas supply; a third conduit means for conducting carrier gas to one of said first set of spaced passages; a sample source; a fourth conduit means for conducting vaporized sample to a second of said first set of passages; a sample loop communicating between a third and fourth of said first set; a fifth conduit means for venting said vaporized sample gas from a fifth of said first set; and a sixth conduit means for conducting said carrier gas and said vaporized sample from the sixth of said first set of passages to a sorption column.

7. A fluid-actuated motor valve sampling system for collecting one of a first fluid and a second fluid from one of their respective conduits and vaporizing the second fluid in the first fluid comprising, in combination; a first body having two opposite faces; a first, second, third, and fourth spaced passages in said first body, each of said spaced passages communicating between the first of said faces and a separate point intermediate the other face thereof, each of said spaced passages there forking into two diverging passages terminating in the second of said faces, so that said first spaced passage communicates with said first and second diverging passages, said second paced passage communicates with said third and fourth diverging passages, said third spaced passage communicates with said fifth and sixth diverging passages, and said fourth spaced passage communicates with said seventh and eighth diverging passages; a first passage serving as an internal sample loop disposed in said first body, ninth and tenth diverging passages communicating at their juncture with one end of said first passage and at their spaced ends with said second face; eleventh and twelfth diverging passages communicating at their juncture with the other end of said first passage and at their spaced ends with said second face; a second body having a third face spaced from said second face of said first body; a first flexible diaphragm disposed within the area defined by said third face and therein protected from compression; a first, second, third, fourth, fifth, and sixth cavities in said third face adjacent said diaphragm and positioned opposite the ports of said first through twelfth of said diverging passages in said first body, respectively, so that said first cavity is opposite said first and eighth diverging passages, said second cavity is opposite said second and ninth diverging passages, said third cavity is opposite said tenth and third diverging passages, said fourth cavity is opposite said fourth and fifth diverging passages, said fifth cavity is opposite said sixth and eleventh diverging passages, and said sixth cavity is opposite said twelfth and seventh diverging passages; second to seventh passages in said second body communicating between said first to sixth cavities therein, respectively, and an area external of said second body; first means connected to supply said first fluid to be collected under a first pressure to said first spaced passage; a second means connected to supply said second fluid to be collected under a second pressure to said second spaced passage; a third means connected to receive said first and second fluids, as desired, from said third spaced passage; a fourth means connected to receive said second fluid from said fourth spaced passage; a fifth means connected to supply, when desired, a third fluid under a third pressure greater than said first and second pressures through said second, fourth and sixth passages to said first, third and fifth of said cavities thereby forcing adjacent first, third and fifth portions of said diaphragm to seal between said ports of said first and eighth, tenth and third, and sixth and eleventh diverging passages of said first body; said fifth means being adapted to vent said first, third and fifth cavities, when desired, whereupon said first and second fluid pressures will establish communication between said ports of said first and eighth, tenth and third, and sixth and eleventh diverging passages, whereby said first fluid enters said valve system through said first means and passes through said first passage and drives a trapped slug of said second fluid out of said valve system through said third means, while said second fluid enters said valve system through said second means and exhausts directly through said fourth means; a sixth means connected to supply, when desired, a fourth fluid under a fourth pressure greater than said first and second pressures through said third, fifth and seventh passages to said second, fourth, and sixth of said cavities, thereby forcing adjacent second, fourth, and sixth portions of said diaphragm thereunder to seal between said second and ninth, fourth and fifth, and twelfth and seventh of said diverging passages, whereby said second fluid passes through said first passage of said valve system and vents via said fourth means while said first fluid enters said valve system through said first means and exits directly through said third means; and said sixth means being adapted to vent said second, fourth and sixth cavities, when desired, whereupon said first and second fluid pressures will establish communication between said ports of said second and ninth, fourth and fifth, and twelfth and seventh passages in said first body above said diaphragm.

8. A two-position, fluid-actuated diaphragm valve sampling system for a chromatographic analyzer comprising, in combination, a first body provided with a first set of four spaced passages, each of said passages communicating being a region external of said first body and a separate juncture point intermediate the lower surface thereof, each of said passages there forking into two diverging passages communicating between said juncture points and said lower surface, so that said first spaced passage communicates with said first and second diverging passages, said second spaced passage communicate with said third and fourth diverging passages, said third spaced passage communicate with said fifth and sixth diverging passages, and said fourth spaced passage communicates with said seventh and eighth diverging passages; a first passage disposed in said first body to serve as an internal sample loop, ninth and tenth diverging passages communicating at their juncture with one end of said first passage and communicating at their spaced ends with said lower surface; eleventh and twelfth diverging passages communicating at their juncture with the other end of said first passage and at their spaced ends with said lower face; said lower face further provided with a plurality of recesses adapted to receive therein a plurality of lugs affixed to adjacent second body, said second body spaced from said first body by a thin metal shim having an inner diameter which is greater than that of a circle described by said lugs; a thin flexible diaphragm of a diameter suited to fit within said lugs; a portion of said upper surface of said second body adjacent said diaphragm being provided with a first to sixth cavities; a power gas source; a first and second conduit means for conducting power gas therefrom to the external sides of said cavities in said second body and sealing the adjacent portions of said diaphragm against the lower surface of said first body, thereby closing the passages between certain of the adjacent external ports of said diverging passages in said first body, as desired; a carrier gas supply; a third conduit means for conducting carrier gas to one of said first set of spaced passages; a sample source; a fourth conduit means for conducting liquid sample to a second of said first set of spaced passages; a fifth conduit means for discharging said liquid sample from a third of said first set of spaced passages; and a sixth conduit means for conducting said carrier gas and said liquid sample slug from the fourth of said first set of spaced passages to a sorption column.

References Cited in the file of this patent

UNITED STATES PATENTS

| 2,575,240 | Thompson | Nov. 13, 1951 |
| 2,813,010 | Hutchins | Nov. 12, 1957 |
| 2,964,938 | Fuller | Dec. 20, 1960 |

OTHER REFERENCES

Gas Chromatography by D. H. Desty, published in London by Butterworths Scientific Publications in 1958, pp. 288–299 relied on.

UNITED STATES PATENT OFFICE
CERTIFICATE OF CORRECTION

Patent No. 3,139,755            July 7, 1964

Marvin E. Reinecke et al.

It is hereby certified that error appears in the above numbered patent requiring correction and that the said Letters Patent should read as corrected below.

Column 8, line 44, for "said", first occurrence, read -- each --; column 9, line 33, for "and" read -- said --; column 12, line 73, for "paced" read -- spaced --; column 14, lines 17 and 19, for "communicate", each occurrence, read -- communicates --.

Signed and sealed this 17th day of November 1964.

(SEAL)
Attest:

ERNEST W. SWIDER
Attesting Officer

EDWARD J. BRENNER
Commissioner of Patents